United States Patent [19]
Hipp

[11] 3,943,009
[45] Mar. 9, 1976

[54] POROUS CERAMIC BATTERY VENT
[75] Inventor: Julius Carl Hipp, Elm Grove, Wis.
[73] Assignee: Globe-Union Inc., Milwaukee, Wis.
[22] Filed: Nov. 30, 1973
[21] Appl. No.: 420,447

[52] U.S. Cl................ 136/177; 136/179; 106/40 R
[51] Int. Cl.² ..................... H01M 2/12; C04B 21/00
[58] Field of Search............ 136/179, 177; 106/40 R

[56] References Cited
UNITED STATES PATENTS

| | | | |
|---|---|---|---|
| 3,753,746 | 8/1973 | Koerner | 106/40 R |
| 3,784,385 | 1/1974 | Nekrasov | 106/40 R |

*Primary Examiner*—Winston A. Douglas
*Assistant Examiner*—Mark Bell
*Attorney, Agent, or Firm*—James L. Kirschnik; John Phillip Ryan

[57] ABSTRACT

A fired porous ceramic battery vent having a porosity and particle size distribution which can effectively permit the venting of cell gases in the battery while at the same time impede a flame from entering the battery container. The fired ceramic body is formed with a high melting point inorganic material containing aluminum and silicon oxides having a particle size no larger than about 600 microns. A lower melting point glass is used to fuse the particles together when in the fired state. The particle size of the high melting point material is important and ranges in size from 200 to 600 microns.

7 Claims, No Drawings

POROUS CERAMIC BATTERY VENT

CROSS REFERENCE TO RELATED APPLICATIONS (None)

BACKGROUND OF THE INVENTION

This invention relates to the venting of lead acid storage batteries. More particularly, it relates to a ceramic body which is placed in the filling cap or the cover of a lead acid storage battery and serves to permit the cell gases to vent through the ceramic stone while at the same time effectively resisting any ingress of flame caused by the ignition of cell vent gases. The ceramic body is designed to effectively retard flame propagation while preventing the accumulation of large volumes of gases in the battery.

Ceramic materials have been utilized in conjunction with storage batteries of the lead acid type so as to prevent an external spark or flame from causing an explosion inside the battery. For example, in U.S. Pat. No. 2,341,382 such an arrangement is described employing a loose ceramic material. In U.S. Pat. Nos. 2,471,585 and 3,630,788 a combined filling and venting device employs a ceramic material in the form of a tubular structure. It is now proposed to utilize flat plate-like slabs of ceramic material in the gang type vent cap as well as a single vent cap. Such a device is described in U.S. patent application Ser. No. 354,514 filed Apr. 26, 1973, now abandoned, which was refiled as U.S. patent application Ser. No. 423,055 filed Dec. 10, 1973, now U.S. Pat. No. 3,879,227, both of which are commonly assigned.

The problem with prior ceramic materials utilized in battery venting devices is the maintenance of open porosity so that the material will adequately vent the battery yet will serve as a barrier to a flame. Prior to this invention, particle distributions were not uniform which is very important when a small size ceramic disc or platelet is to be employed in a battery vent. Other problems with available ceramic materials reside in excessive wear in the dies utilized to stamp the green ceramic material for example, fused alumina, prior to their being fired in a kiln. In order to be effective as a flame barrier as well as a venting material, the ceramic must have a very critical particle size range, be able to withstand normal handling as it is bulk shipped, be acid and heat resistant and not collapse during pressing so as to expose particles which are not wetted with bonding agent.

It is an object of the present invention to provide a novel porous ceramic material which very effectively serves to vent explosive gases from storage batteries in a manner that any external ignition is impeded from being transmitted into the battery casing. It is another object of this invention to provide a porous ceramic material which exhibits a narrow controlled range of back pressure under given gas flow conditions. It is still another object of this invention to provide a novel unfired ceramic material which reduces the wearing action on the pressing tools during its pelletizing. It is yet another object of this invention to provide a fired ceramic material which is acid resistant, heat resistant and also has good strength after being fired so that it can be handled in bulk shipments and assembling equipment without cracking or chipping.

SUMMARY OF THE INVENTION

The foregoing objects are accomplished and the shortcomings of the prior art are overcome by the present fired ceramic body which is in the form of fused homogeneous particulate matter composed of a major portion of a high melting point inorganic material having a particle size no larger than about 600 microns. The inorganic material contains essentially aluminum and silicon oxides. A minor portion of a lower melting point glass bonding agent is employed to bind the high melting point inorganic material after it is fired. The use of the glass with the higher melting point inorganic material is critical in that the glass must wet and bond the grains of aluminum and silicon oxides without pulling them into solution and changing the particle distribution. The fired body has an open pore porosity of about 25% to about 50%. This is accomplished by providing a selected range of particle sizes for the inorganic material. In a preferred composition, the inorganic material is present in an amount of about 80% to 95% by weight and the glass bonding agent composes about 20% to about 5% by weight. An optimum range of particle sizes found to achieve the desired back pressure of cell vent gases and provide a flame barrier resides in 45% by weight of the particles screened in the 600 to 400 micron range, 45% in the 400 to 300 micron range and 10% in the 300 to 200 micron range.

The preferred inorganic materials are mixtures of aluminum and silicon oxides and the lower melting point glass is a mixture of clay and feldspar. To achieve constantly controlled compaction of the green ceramic without tool wear, a wax and a lubricant are added to the high melting point inorganic material and the lower melting point glass. The green material is compacted at a compression force in the range 2 to 3 tons per square inch and fired in a kiln at a temperature of at least 2300°F.

Another important feature of the invention is the particle size of the high melting point inorganic material. None of the particles should be larger than 600 microns and a particle size distribution according to the following mesh sizes has been found to work exceedingly well:

| Weight % | Microns |
|---|---|
| 45 | 600 – 400 |
| 45 | 400 – 300 |
| 10 | 300 – 200 |

DESCRIPTION OF THE PREFERRED EMBODIMENT

The following Examples are set forth for the purpose of illustrating the invention and should not be construed to limit the invention to the precise ingredients, proportions or steps shown.

EXAMPLE I

The preferred material composing the high melting point inorganic material is kyanite available from Kyanite Mining Corporation in Dillwyn, Virginia. This material has the formula $Al_2O_3.SiO_2$ and in its raw form has the following analysis and physical properties:

| Ingredient | Analysis Weight % |
|---|---|
| $Al_2O_3$ | 59.05 |
| $SiO_2$ | 38.65 |
| FeO | 0.94 |
| $TiO_2$ | 0.67 |
| CaO | 0.03 |
| MgO | 0.01 |
| Alkalies | 0.42 |
| Loss of ignition | 0.21 |

| Physical Properties | |
|---|---|
| Streak | Colorless |
| Hardness | 5–7 on the mols scale |
| Seger Cone | 36–37 |
| Spec. Grav. | 3.5–3.7 |
| Color | Blue-green to colorless |

The raw kyanite is available in a 35 mesh size which contains 30 – 70 mesh material and is screened into designated micron ranges. This screening is conveniently carried out by feeding the 35 mesh material into a standard multisize screening machine such as a Ross Sifter which is set up with double layers of 70, 50 and 40 mesh screens. The kyanite is double screened to obtain: less than 70 mesh from the 70 mesh screens; less than 50 but greater than 70 mesh from the 50 mesh screens; less than 40 but greater than 50 from the 40 mesh screens as well as greater than 40 mesh material from the 40 mesh screens which is screened to remove any material greater than 30 mesh. Any material passing through the 70 mesh screens is considered too fine and is discarded. The screened portions will be utilized as follows:

| Weight % | Mesh size | Pounds |
|---|---|---|
| 45 | 30 – 40 | 38.7 |
| 45 | 40 – 50 | 38.7 |
| 10 | 50 – 70 | 8.6 |

The following will indicate the powder preparation for the previously indicated kyanite material in combination with the lower melting point glass bonding agent as well as the binder and lubricant. The weight of the kyanite and the glass is described for a 100 pound batch with the binder and the lubricant being added:

| Material | Weight % |
|---|---|
| Kyanite | 86.00 |
| Glass | 14.00 |
| Binder | 20.00 |
| Lubricant | 2.16 |

The glass material is composed of clay and feldspar. The clay is available from J. M. Huber Corp., Havre de Grace, Md. under the trademark "Kaolex" and the feldspar from International Minerals Corp., Skokie, Ill. under the name Kingman feldspar. These materials were used in the following amounts:

| % | Material | Pounds |
|---|---|---|
| 8 | Clay | 1.12 |
| 92 | Feldspar | 12.88 |

The binder composition is a micro crystaline wax material capable of being emulsified in water and having a melting point of 175°F. It is sold under the name Hyform No. 1201 by the Industrial Chemicals and Plastics Division of American Cyanamid Co., Wayne, N.J.

The lubricant is composed of the following:

| Ingredient | % |
|---|---|
| Aluminum powder | .41 |
| Zinc stearate | 1.75 |

The aluminum powder is Alcoa Albron powder — No. 422 pigment available from Alcoa Distributors. The zinc stearate is of a 325 mesh and available from Witco Chemical Corp., Chicago, Ill.

The entire 20 pounds of the wax binder material is placed in a suitable container and is mixed with a Lightening propeller type mixer which is set at about 60 rpm. To the mixed wax material is added 1.12 pounds of the clay and the feldspar is also added in a similar manner. The entire mixture is then mixed for one hour. The kyanite material in the indicated particle range sizes and amounts is added to a heated Marion mixer of the horizontal blade type with the heater set at 160°F. The mixer is run for 2 minutes with the indicated kyanite material with one third of this mix being recycled at least three times at one minute intervals.

The previously described glass-binder premix is then added slowly into the Marion mixer. The Marion mixer is subsequently run for approximately 3½ hours with periodic recycling of portions of the mixed materials. After the materials are thoroughly mixed, they are discharged into steel pans and placed in an oven set at 150°F ± 10°. The material is dried until the moisture content is at 0.2% maximum which will normally take about 12 to 16 hours. The pan dried material is next pulverized by passing it through a Fitzsimmons hammer-mill known as a Fitzmill granulator using a 2A screen with 0.093 inch holes. The granulated material is then run through a single layer vibrating screen such as a Racine Universal Screener with the machine set at 23° and a 14 mesh screen to obtain less than 16 mesh material through the screen. Any oversized material is then rerun through the Fitzmill again and rescreened. The analysis of the finished powder is taken using a sifter, such as a Fisher-Wheeler, having 16, 30, 40, 50 and 70 mesh screens. Analysis must fall within the following limits:

| Mesh | % |
|---|---|
| −16 | 100 |
| +30 | 10–30 |
| +40 | 30–45 |
| +50 | 25–40 |
| +70 | 4–12 |
| −70 | 3–10 |

Bulk density tests are taken on a 100 gram sample of the finished powder and the settled volume should be within the 74 to 79 range. A loss on the ignition test is taken on a 20 gram sample and the weight loss must be in the range of 7.0 to 8.0%. A loss on drying test is taken on a 20 gram sample and must be 0.2% maximum. The previously processed powder should weigh in the amount of 100 – 108 pounds and to it is added 0.44 pounds (or 0.41%) of the aluminum powder. The materials are blended in a rolling drum for 5 minutes. To this admixture is added 1.75% of the zinc stearate in the drum and the entire mixture blended for 5 minutes. An additional ½% of the zinc stearate (25 grams for each ten pounds) is added to all powder lots immediately prior to pressing. The resulting product is now ready for pressing.

A Dorst TPA4 press or equivalent is employed with the die being of a size to result in a part having a length of 0.985 to 1.00 inch, a width of 0.485 to 0.500 and a height of 5/32 or 0.1512 to 1.61 inch. The machine is set to press the individual pellets at 2 to 3 tons per square inch, with a press rate of 30 pieces per minute. The resulting pelletized product is next fired in a kiln at 2330°F with the kiln being of the circular car pusher type and the time for firing being 19 hours.

The resulting ceramic product when processed according to the foregoing steps results in a product which is very efficient in flame retardation when utilized in a vent plug in a lead acid storage battery. Product has a particle size range and distribution resulting in the back pressure in a narrow range of 5½ to 7¼ centimeters of water at 4,000 cc/min gas flow through the ceramic product having the aforementioned dimensions and with a pressed density of 35.5 to 37.5 grams/in$^3$. Preferably the gas flow should be a hydrogen and oxygen gas mixture comparable to that generated within the battery during overcharge conditions, but is has been found that an air or nitrogen gas flow gives acceptable correlation. It can be pelletized under the indicated high pressures without excessive tool wear and with uniformity of the formed particle after numerous production runs. The ceramic product also has good grain strength due to the wax material and also has good firing strength due to the utilization of the lower melting point glass binder. Regarding the strength, a Modulous of Rupture of 2275 to 2525 psi. was obtained for the material at a density of 35.5 to 37.5 grams/in$^3$. Further, the fired ceramic has an open porosity of 25% – 45%, a melting point higher than 500°F and is acid proof with less than ½% weight loss after prolonged exposure to battery electrolyte (the prolongation being for a time substantially equivalent to the accelerated life expectancy of a vent).

DESCRIPTION OF ALTERNATIVE EMBODIMENTS

Examples II, III and IV illustrate the alternative use of mullite, fused silica and bubble alumina, respectively, for kyanite in Example 1.

EXAMPLE II

The following ceramic powder formulation, as well as those described in EXAMPLES III and IV, can be substituted for that described in EXAMPLE I for producing a 1500.0 gram batch (exclusive of the wax) which is calculated on the total weight of the mullite.

| Material | Weight % |
| --- | --- |
| Mullite | 81.04 |
| Glass | 18.96 |
| Binder | 30.02 |

The glass and wax binder in this EXAMPLE and in EXAMPLES III & IV are the same as employed in EXAMPLE I. The mullite is available from the same source as the kyanite and has the formula $3Al_2O_3 \cdot 2SiO_2$. It has the following analysis:

| Ingredient | Weight % |
| --- | --- |
| $Al_2O_3$ | 59.17 |
| $SiO_2$ | 38.73 |
| FeO | 0.94 |
| $TiO_2$ | 0.67 |
| CaO | 0.03 |
| MgO | 0.01 |
| Alkalies | 0.42 |
| Loss of ignition | — |

The physical properties of the mullite are the same as for the kyanite except that the mullite has a specific gravity of 2.9 – 3.1.

The mullite, glass and wax are processed according to the same steps as set forth for the kyanite, glass and binder in EXAMPLE I. The same lubricant in the designated amounts is also employed as well as in EXAMPLES III and IV. The resulting product is the same except as that produced in EXAMPLE I except that the hardness of mullite while significantly lower than that of fused alumina products, would still be higher than for kyanite and consequently would result in greater tool wear.

EXAMPLE III

| Material | Weight % |
| --- | --- |
| Fused Silica | 88 |
| Glass | 12 |
| Binder | 10 |

The total weight of the fused silica and glass is 300 grams and the materials were processed in the same manner as the corresponding materials in EXAMPLE I. The resulting product would have a higher back pressure, lower strength and be of a higher cost than a product employing kyanite as produced in EXAMPLE I.

EXAMPLE IV

| Material | Weight % |
| --- | --- |
| Bubble $Al_2O_3$ | 88 |
| Glass | 12 |
| Binder | 19 |

The bubble alumina is of the same composition as fused alumina except it is of a different structure. The total weight of the bubble alumina and glass is 300 grams and the materials were processed in the same manner as the corresponding materials in EXAMPLE I. The resulting product would be of much lower strength and have a greater range of back pressure than the product produced in EXAMPLE I.

In the preceding description, the preferred particle range for the high melting point inorganic material is indicated. It should be understood that these ranges could be varied so that 50 to 75% of the particles are in the 600 to 400 micron or 30 – 40 mesh size range and 50 to 25% are in the 200 to 300 micron or 50 – 70 mesh size range; alternatively, 25 to 50% could be in the 200 to 300 micron range and 75 to 50% in the 400 to 300 micron range and still accomplish the benefits as indicated for the ceramic material. A preferred quantity of 86% of the high melting point kyanite material and 14% of the lower melting point bonding glass is indicated. It should be understood that 80 to 95% of the major portion of the high melting point kyanite could be utilized in conjunction with 20 to 5% of the lower melting point glass. While a preferred glass is one composed of clay and feldspar, it should be understood that the following glass compositions could be substituted for the binders indicated in the previous EXAMPLES I – IV:

GLASS FORMULA 1
(Borosilicate Glass)

| Material | Weight (lbs) |
|---|---|
| Sand (SiO$_2$) | 1,000 |
| Nepheline Syenite | 118 |
| Borax (anhydrous) | 122 |
| Boric Acid | 149 |
| Sodium Nitrate | 5 |
| Arsenic | 5 |

This glass material has a melting point of 1,000°C.

GLASS FORMULA 2
(Lead Borosilicate)

| Material | Molecular Composition |
|---|---|
| Lead Oxide | 0.20 |
| Potassium Oxide | 0.15 |
| Sodium Oxide | 0.25 |
| Calcium Oxide | 0.40 |
| Aluminum Oxide | 0.40 |
| Boron Oxide | 0.60 |
| Silicon Dioxide | 4.00 |

This glass has a melting point of 560°C.

GLASS FORMULA 3
(Lead Silicate)

| Material | Molecular Composition |
|---|---|
| Lead Oxide | 1.0 |
| Aluminum Oxide | 0.1 |
| Silicon Dioxide | 2.0 |

This glass has a melting point of 650°C.

GLASS FORMULA 4
(Lead-Alumina-Silicate)

| Material | % Amount |
|---|---|
| Lead Oxide | 91.2 |
| Aluminum Oxide | 5.2 |
| Silicon Dioxide | 3.6 |

This glass has a melting point of 764°C.

Additionally, other glasses of the lower melting point type in the range of 1000°F – 2500°F and containing sodium, potassium and lead silicates can be used.

While kyanite is indicated as the preferred high melting point inorganic material, other high melting point silicate and/or aluminum dioxide containing materials including high temperature glasses could be substituted. A preferred microcrystalline wax material in a designated amount is indicated for giving green strength to the prefired and pelletized ceramic composition. Other waxes of the microcrystalline type and capable of being emulsified in water with the melting points in the 122°/175°F range and preferably a wax having a melting point of 175°F, could be substituted in amounts from 2% to 15% of the high melting point inorganic and glass material, or the preferred wax used in the broader range. Examples of such materials are the wax emulsions produced by Socony Mobil Oil Co. Inc. under the tradename Mobilciers "C", "M" and "R". In place of the lubricants and the designated amount, other organic or metallic materials present in the range of 0.5% to 5% of the high melting point inorganic and glass material, or the preferred material in the broader range, all having a low coefficient of friction which will burn out during firing, could be utilized such as other metal salts of long chain fatty acids including calcium, barium or lead stearates or oleates. The aluminum powder portion of the lubricant could be eliminated or substituted with other inorganic oxide powders such as zinc, tin or lead. While pelletizing or die stamping the green part is a preferred manner for forming the grained ceramic material of this invention, other methods such as extruding could be substituted. However, this latter method could pose a problem in maintaining adequate densities.

It will thus be seen that through the present invention there is now provided a novel ceramic material which has uniformity and particle size distribution. This results in a highly efficient flame arrester in the plug or cover portions of batteries and particularly the lead acid battery. The back pressure of gases through the ceramic body can be controlled in a narrow range which thereby permits a high degree of control of product characteristics. The ceramic material has good structure and stability and yet does not pose excessive wear during die stamping. Consistently uniform production runs can be achieved with existing equipment and without requiring special skills on the part of the operator.

The foregoing invention can now be practiced by those skilled in the art. Such skilled persons will know that the invention is not necessarily restricted to the particular embodiments herein. The scope of the invention is to be defined by the terms of the following claims as given meaning by the preceding description.

I claim:

1. A porous, fired ceramic battery vent in the form of fused homogenous particulate matter comprising:
    an inorganic filler material comprising individual particles having a particle size no larger than about 600 microns and being present in an amount of about 80% to about 95% by weight, said filler material containing aluminum and/or silicon oxide;
    a glass binder present in an amount of about 20% to 5% by weight, said binder having a melting point in the range of about 1,000°F to 2,500°F;
    said filler material having a melting point in excess of said binder material and having about 50% to 75% of the particles in the 400 to 600 micron range and about 50% to 25% of the particles in the 200 to 300 micron range; and
    said fired vent material having an open porosity of about 25% to about 50% and being substantially acid resistant.

2. The porous, fired ceramic battery vent as defined in claim 1 wherein both said aluminum and silicon oxides are present and said aluminum oxide is present in a greater quantity than said silicon oxide.

3. The porous, fired ceramic battery vent as defined in claim 1 wherein said high melting point inorganic material is present in an amount of about 86% by weight and said lower melting point glass is present in an amount of about 14%.

4. A porous, fired ceramic battery vent in the form of fused homogenous particulate matter comprising:
- an inorganic filler material comprising individual particles having a particle size no larger than 600 microns and being present in an amount of about 80% to 95% by weight, said filler material containing aluminum and/or silicon oxide;
- a glass binder present in an amount of about 20% to 5% by weight, said binder having a melting point in the range of about 1,000°F to about 2,500°F;
- said filler material having a melting point in excess of said binder material and having about 25% to about 50% of the particles in the 200 to 300 micron range and about 75% to about 50% of the particles in the 300 to 400 micron range; and
- said fired vent material having an open porosity of about 25% to about 50% and being substantially acid resistant.

5. A porous, fired ceramic battery vent as defined in claim 4 wherein both said aluminum and silicon oxides are present and said aluminum oxide is present in a greater quantity than said silicon oxide.

6. A porous, fired ceramic battery vent as defined in claim 5 wherein said inorganic filler material is present in an amount of about 86% by weight and said glass binder is present in an amount of about 14%.

7. A porous fired ceramic battery vent in the form of fused homogenous particulate matter comprising:
- an inorganic filler material comprising individual particles having a particle size no larger than about 600 microns and being present in an amount of about 80% to 95% by weight, said filler material containing aluminum and/or silicon oxide;
- a glass binder present in an amount of about 20% to 5% by weight, said binder having a melting point in the range of about 1,000°F to 2,500°F;
- said filler material having a melting point in excess of said binder material and having about 45% by weight of the particles in the 600 to 400 micron range, about 45% by weight in the 400 to 300 micron range and about 10% by weight in the 300 to 200 micron range; and
- said fired vent material having an open porosity of about 25% to 50% and being substantially acid resistant.

* * * * *